United States Patent
Watanabe et al.

[11] Patent Number: 6,157,491
[45] Date of Patent: Dec. 5, 2000

[54] LENTICULAR LENS SHEET

[75] Inventors: Hitomu Watanabe; Kunpei Oda, both of Shinjuku-Ku, Japan

[73] Assignee: Dai Nippon Printing Co., Ltd., Japan

[21] Appl. No.: 09/137,703

[22] Filed: Aug. 21, 1998

[30] Foreign Application Priority Data

Aug. 26, 1997 [JP] Japan ................................. 9-229425

[51] Int. Cl.[7] ............................................... G02B 27/10
[52] U.S. Cl. ........................................ 359/619; 359/620
[58] Field of Search ................................ 359/618, 619, 359/620

[56] References Cited

U.S. PATENT DOCUMENTS

| | | | |
|---|---|---|---|
| 5,422,285 | 6/1995 | Ishibe | 359/619 |
| 5,568,313 | 10/1996 | Steenblik et al. | 359/619 |
| 5,581,407 | 12/1996 | Mitani et al. | 359/619 |
| 5,636,056 | 6/1997 | Itonaga et al. | 359/619 |
| 5,642,226 | 6/1997 | Rosenthal | 359/619 |

FOREIGN PATENT DOCUMENTS 8-313865  11/1996  Japan .

*Primary Examiner*—Loha Ben

[57] ABSTRACT

A lenticular lens sheet for use as a rear-projection screen, comprises a body sheet; back lenses having a substantially elliptic cross section and formed in a back surface of the body sheet; front lenses formed in a front surface of the body sheet at the focal points of the back lenses or in the vicinity thereof; and a light absorbing layer formed on sections of the front surface at the non-focal points of the back lenses. Pitches p of the back and the front lenses, and thickness t of the lenticular lens sheet equal to distance between a plane in contact with the back lenses and a plane in contact with the front lenses meet an inequality: $1.1 \leq t/p \leq 1.4$, and conic coefficient k of a conic section defining the cross section of the back lenses is in the range of $-0.5$ to $-0.4$.

10 Claims, 7 Drawing Sheets

LENTICULAR LENS SHEET

BACKGROUND OF THE INVENTION

1. Field of the Invention

The present invention relates to a lenticular lens sheet for use as a rear-projection screen for a projection television system in which light rays from a picture source are projected on a projection display screen on an enlarged scale by a lens system. More particularly, the present invention relates to a lenticular lens sheet for use as a rear-projection screen on which a picture produced by a single picture source, such as an LCD (liquid crystal display) or a DMD (digital micromirror device) is projected for observation.

2. Description of the Related Art

A known projection television system employs three picture sources, i.e., a red, a green and a blue CRT, enlarges pictures formed by the three picture sources by a projection lens system, and projects the enlarged pictures on a rear-projection screen. Liquid crystal projection television systems have been used in recent years instead of such projection television systems employing three CRTs. The liquid crystal projection television system employs three LCD panels, i.e., red, green and blue LCD panels, as picture sources, combines pictures formed by the three LCD panels by a dichroic mirror to form a composite picture, and displays the composite picture. The brightness and contrast of pictures produced by the current LCD are lower than those of pictures produced by a picture source comprising red, green and blue CRTs. Therefore, it is desired that an LCD rear-projection screen for displaying pictures produced by the LCD picture source is capable of displaying pictures in a contrast higher than that of pictures displayed on a CRT rear-projection screen for displaying pictures produced by the CRT picture source.

When a lenticular lens sheet provided with a light absorbing layer on its front surface, i.e., a surface on the side of viewers, is used as a rear-projection screen, a method which increases the black stripe ratio of the lenticular lens sheet, i.e., the ratio of the area of black stripes formed on the front surface of the lenticular lens sheet to that of the front surface of the lenticular lens sheet (hereinafter referred to as "BS ratio") is the most effective means for increasing the contrast of pictures displayed on the lenticular lens sheet. Generally, the LCD picture source is provided with a single LCD and, therefore, less light rays fall from oblique directions on the lenticular lens sheet when the LCD picture source is used than when the CRT picture source is used. Therefore the BS ratio of the lenticular lens sheet can easily be increased when the LCD picture source is used.

FIGS. 7A and 7B show a single-display lenticular lens sheet 1 for displaying pictures produced by a single-display picture source and a three-display lenticular lens sheet 1 for displaying pictures produced by a three-display picture source, respectively. Light rays emitted by a single-display picture source fall on the back surface of the lenticular lens sheet 1, i.e., a surface facing the picture source, more specifically, on a plane in contact with a plurality of lenticular lenses forming the back surface of the lenticular lens sheet 1, at incident angles about a specific angle as indicated by solid lines in FIG. 7A and hence a light absorbing layer 4 can be formed in a large BS ratio. Light rays emitted by the three displays of a three-display picture source fall on the back surface of the lenticular lens sheet 1 at incident angles about a plurality of different incident angles (only two different incident angles are shown in FIG. 7B) as indicated by solid lines and dotted lines in FIG. 7B and hence a light absorbing layer 4 cannot be formed in a large BS ratio to transmit the oblique incident light rays indicated by dotted lines.

Geometrically, an upper limit of the BS ratio is in the range of 50 to 55% if, for example, the oblique incident light rays indicated by dotted lines fall on the back surface of the lenticular lens sheet 1 at an incident angle of 10°. Generally, the light absorbing layer 4 is formed on the surfaces of elevated sections 5 having a substantially rectangular cross section. If the elevated sections 5 have a great height, light rays leaving lenses 3 on the front surface of the lenticular lens sheet 1 are trapped by the elevated sections 5, so that the viewing angle of the lenticular lens sheet 1 is narrowed. A rear-projection screen proposed in JP 8-313865A for displaying pictures produced by an LCD or a DMD employs a Fresnel lens in diffusing projected light rays to reduce scintillation. Since light rays fall on the lenticular lens sheet at incident angles distributed in a certain range, the quantity of light which is not emitted by the lenticular lens sheet increases if the BS ratio is excessively large.

Generally, light rays leaving the Fresnel lens disposed on the back surface of the lenticular lens sheet are substantially parallel and are not exactly parallel. Therefore, light rays other than those falling on a central section of the lenticular lens sheet with respect to the width of the lenticular lens sheet fall obliquely on the lenticular lens sheet. Back lenses and front lenses are formed respectively on the back surface and the front surface of the lenticular lens sheet with an optical registration but with a geometrical positional difference between the back lens and the corresponding front lens, to transmit light rays efficiently. JP 59-69748A proposes a method of determining the positional difference d of the lenticular lens sheet by using the following expression:

$$d = t \cdot \tan(\sin^{-1}[\sin\{\tan^{-1}(r/f_2)\}/n])$$
$$= r \cdot t / \sqrt{\{n^2(r^2 + f_2^2) - r^2\}}$$

where t is the thickness of the lenticular lens sheet, i.e., the distance between the respective surfaces of lenses on the back surface and lenses on the front surface, n is the refractive index of the material forming the lenticular lens sheet, r is the distance from the center, and $f_2$ is the focal length of the Fresnel lens.

In a strict sense, this expression merely expresses the positional difference between a light ray leaving a Fresnel lens and falling on the back surface of a flat plate of having a thickness t, and a light ray leaving the front surface of the flat plate. As shown in FIG. 9, light rays obliquely falling on a convex lens 2 (a lens on the back surface) of a lenticular lens sheet 1 are not focused on a single point because those light rays are subject to aberration, and the light rays leave the front surface from a region having a width in the front surface. Accordingly, only a positional difference from a light ray $a_0$ falling on the top of the convex lens 2 can be calculated by the foregoing expression. As is apparent from the tracking of the path of the light ray $a_0$, the light ray $a_0$ leaves the front surface of the lenticular lens sheet at a position at one end of a range having a width in which the light rays are distributed due to aberration. If a lens 3 on the front surface is substantially flat, the light ray $a_0$ leaving the lens 3 travels in a direction substantially normal to the front surface. A light ray $a_1$ falling on the lens 2 on the back surface at a position at one end of the lens 2 intersects a region on the lens 3 on the front surface at one end of the region corresponding to the other end of the lens 2 and leaves the lens 3 in a direction at a large angle to a normal to the surface of the lens 3. Therefore, at least the light rays falling on one end of the lens 2 or the light rays falling oh the other end of the lens 2 are trapped by the elevated section 5 if the BS ratio is increased without changing the positional difference, which reduces the viewing angle of the lenticular lens sheet when used as a display screen.

SUMMARY OF THE INVENTION

Accordingly, it is an object of the present invention to provide a lenticular lens sheet to be used as a rear-projection screen for displaying a picture projected thereon for viewing by a single picture source, provided with a light absorbing layer formed in a large BS ratio, and capable of reducing the influence of variation of positional difference between the back and the front surface thereof, of diffusing light rays in a wide angular range and of displaying pictures with a high contrast.

The above and other objects, features and advantages of the present invention will become more apparent from the following description taken in connection with the accompanying drawings.

DESCRIPTION OF THE PREFERRED EMBODIMENTS

Figure 1:
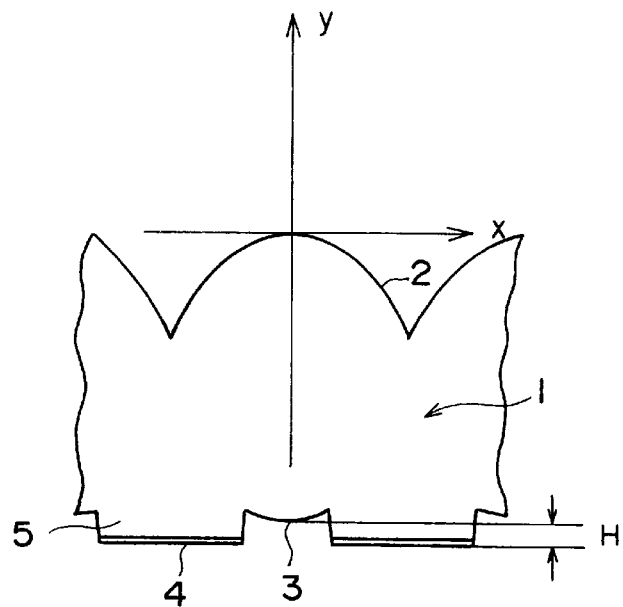
FIG. 1 is a fragmentary sectional view of a lenticular lens sheet in a first embodiment according to the present invention.

Referring to FIG. 1 showing a lenticular lens sheet 1 in a first embodiment according to the present invention, the lenticular lens sheet 1 has back lenses 2 forming a back surface, front lenses 3 forming a front surface and each disposed near the focal point of the corresponding back lens 2, elevated parts 5 formed contiguously with adjacent front lenses 3, respectively, and a light absorbing layer 4 having areas covering the elevated parts 5. Generally, the back lenses 2 of the lenticular lens sheet 1 may be those having a circular, elliptic or nonspherical cross section. However, it is desirable, in view of ensuring forming the light absorbing layer 4 in a large BS ratio (the ratio of the area of the light absorbing layer 4 to that of the front surface of the lenticular lens sheet 1), that the back lenses 2 have a cross section of a curve having a conic coefficient k of about −0.45 used in the following general expression defining the shape of the back lens 2 on an orthogonal coordinate system having an x-axis perpendicularly crossing the generating line of the surface of the back lens 2 and a y-axis parallel to the thickness of the lenticular lens sheet 1:

$$y = \frac{-(x^2/c)}{\left[1 + \sqrt{\{1-(k+1)(x/c)^2\}}\right]}$$

where c is paraxial radius of curvature.

When the back lenses 2 have a sectional shape defined by the above expression, the longitudinal aberration of the incident light rays is zero and the incident light rays can be focused substantially at one point. Even if the conic coefficient k is not equal to −0.45, the focal point is dislocated longitudinally along the optical axis of the back lens 2 and the longitudinal aberration of incident light rays is not very significant when the conic coefficient k meets an inequality: $-0.5 \leq k \leq -0.4$. The BS ratio can be increased by determining the area of the front lens 3 on the basis of a light ray fallen on the root edge of the back lens 2.

The width of the front lenses 3 of a lenticular lens sheet having a large BS ratio is, as a matter of course, small. Therefore the front lenses 3 must have a considerably small radius of curvature to diffuse light rays by the front lenses 3. However, the front lenses 3 having a small radius of curvature are not preferable because slight variation of optical registration between the back lenses 2 and the front lenses 3 greatly affects the diffusing characteristic of the lenticular lens sheet 1 if the front lenses 3 have a small radius of curvature. Preferably, the back lenses 2 are used mainly for diffusing light rays, the front lenses 3 are formed in a convex cross section of a great radius of curvature and the front lenses 3 are formed inside the focal point of the corresponding back lenses 2 to provide the lenticular lens sheet 1 with a large viewing angle.

Figure 2:
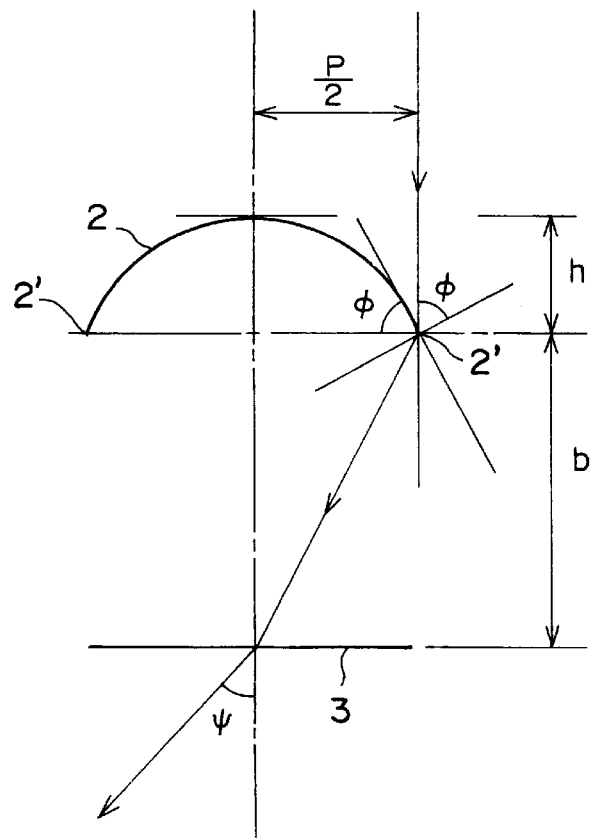
FIG. 2 is a diagrammatic view showing an optical path of a light ray that has fallen on the lenticular lens sheet of FIG. 1 at an edge of a lenticular lens.
Figure 3:
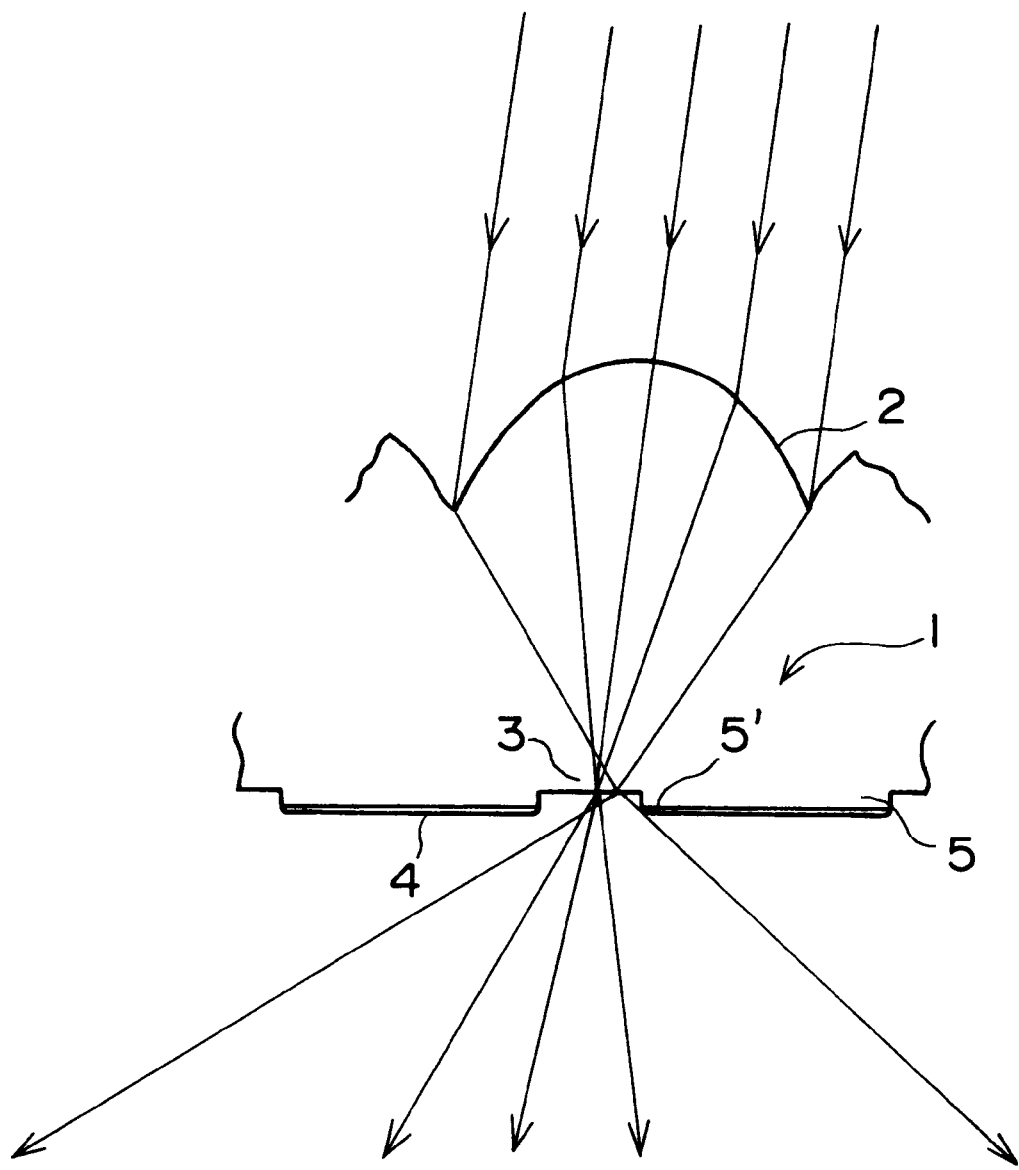
FIG. 3 is a fragmentary sectional view of a lenticular lens sheet in a second embodiment according to the present invention.

FIG. 2 illustrates an optical path along which a light ray fallen on a lenticular lens sheet 1 at the root edge 2' of a back lens 2 having k=−0.45 travels through the lenticular lens sheet 1 and leaves the same through a flat front lens 3 at an outgoing angle Ψ. Table 1 shows calculated values of outgoing angle Ψ, i.e., an angle between a normal to the surface of the flat front lens 3 and the path of the outgoing light ray, the height h of the-black lens 2, the distance b between the root edge 2' of the back lens 2 and the front lens 3, the paraxial radius of curvature c of the back lens 2, and the ratio p/2c (p is the pitch of the back lenses 2, i.e., the width of the back lenses 2) for incident angles φ in the range of 30° to 70°.

TABLE 1

| φ (°) | Ψ (°) | b (mm) | h (mm) | p/2c |
|---|---|---|---|---|
| 30 | 15.9 | 2.69 | 0.14 | 0.531 |
| 40 | 22.3 | 1.92 | 0.19 | 0.712 |
| 50 | 29.7 | 1.42 | 0.26 | 0.893 |
| 60 | 38.9 | 1.08 | 0.33 | 1.064 |
| 70 | 51.0 | 0.83 | 0.42 | 1.210 |

Note: n=1.5, p=1.0 mm, k=−0.45.

Values tabulated in Table 1 are calculated by using the expressions:

$$\sin\psi = n\cdot\sin\left\{\phi - \sin^{-1}\left(\frac{\sin\phi}{n}\right)\right\}$$

$$b = \frac{(p/2)}{\tan\left\{\phi - \sin^{-1}\left(\frac{\sin\phi}{n}\right)\right\}}$$

$$h = p\left[\sqrt{\{1+(k+1)\tan^2\phi\}} - 1\right] \div \{2(k+1)\tan\phi\}$$

$$\frac{p}{2c} = \frac{\tan\phi}{\sqrt{\{1+(k+1)\tan^2\phi\}}}.$$

It is known from Table 1 that the angle $\phi$ is 60° or above, the above ratio p/2c is 1.0 or above, and the thickness t (=b+h) of the lenticular lens sheet 1 must be 1.4 mm or below to provide the lenticular lens sheet 1 with an outgoing angle ((angle of diffusion) of 40° or above b the back lenses 2. Those values are calculated on an assumption that the front lenses 3 have a flat surface. If the front lenses 3 are convex lenses having curved surface of a large radius of curvature and the front lenses 3 are formed inside the focal point of the back lenses 2, the angle of diffusion will increase and therefore, p/2c≧0.9 and t≦1.35. Preferably, $\phi$<75° in view of securing stability when machining a mold for molding the lenticular lens sheet and when manufacturing the lenticular lens sheet. When $\phi$<75°, $\Psi$=59.1°, p/2c=1.268, b=0.72 mm and t=1.19 mm. Therefore, the lower limit of the thickness t is 1.1 mm to form the front lenses 3 inside the focal point of the back lenses 2. When the pitch p is optional, 1.1≦t/p≦1.4.

If a lenticular lens sheet is used as a rear-projection screen to be used in combination with an LCD or a DMD, a Fresnel lens containing a light diffusing material is employed to diffuse light rays before receiving the light rays by the lenticular lens sheet to reduce scintillation. Accordingly, if the BS ratio is increased near to a theoretical limit determined by, for example, a light tracking method or the like, a large quantity of light is absorbed by the light absorbing layer 4. Therefore the diffusion of light must be taken into consideration when determining the width of the front lenses 3 of the lenticular lens sheet.

Figure 8:
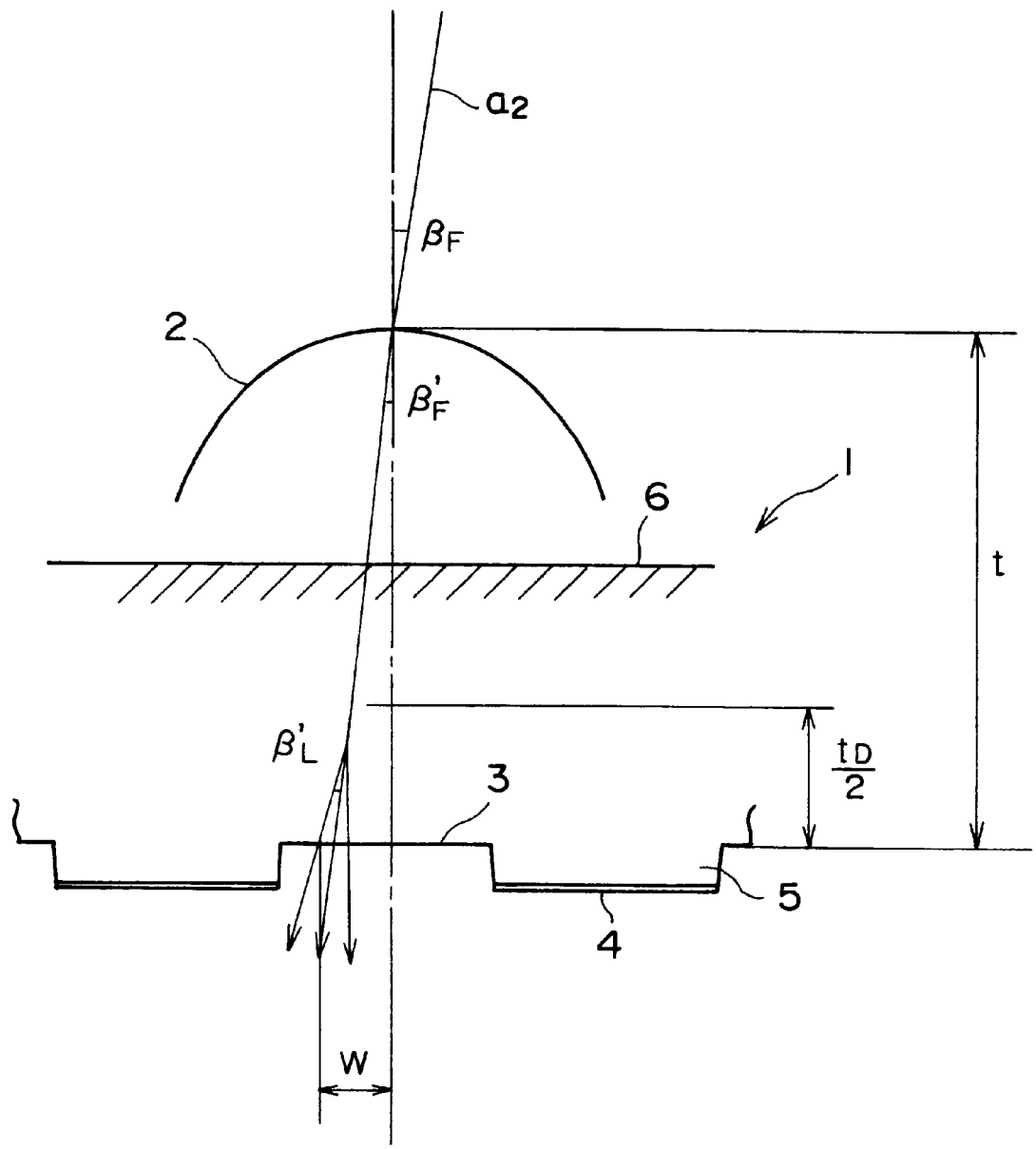
FIG. 8 is a sectional view of a model of a lenticular lens sheet for determining the BS ratio of the lenticular lens sheet taking diffusion into consideration.
Figure 9:
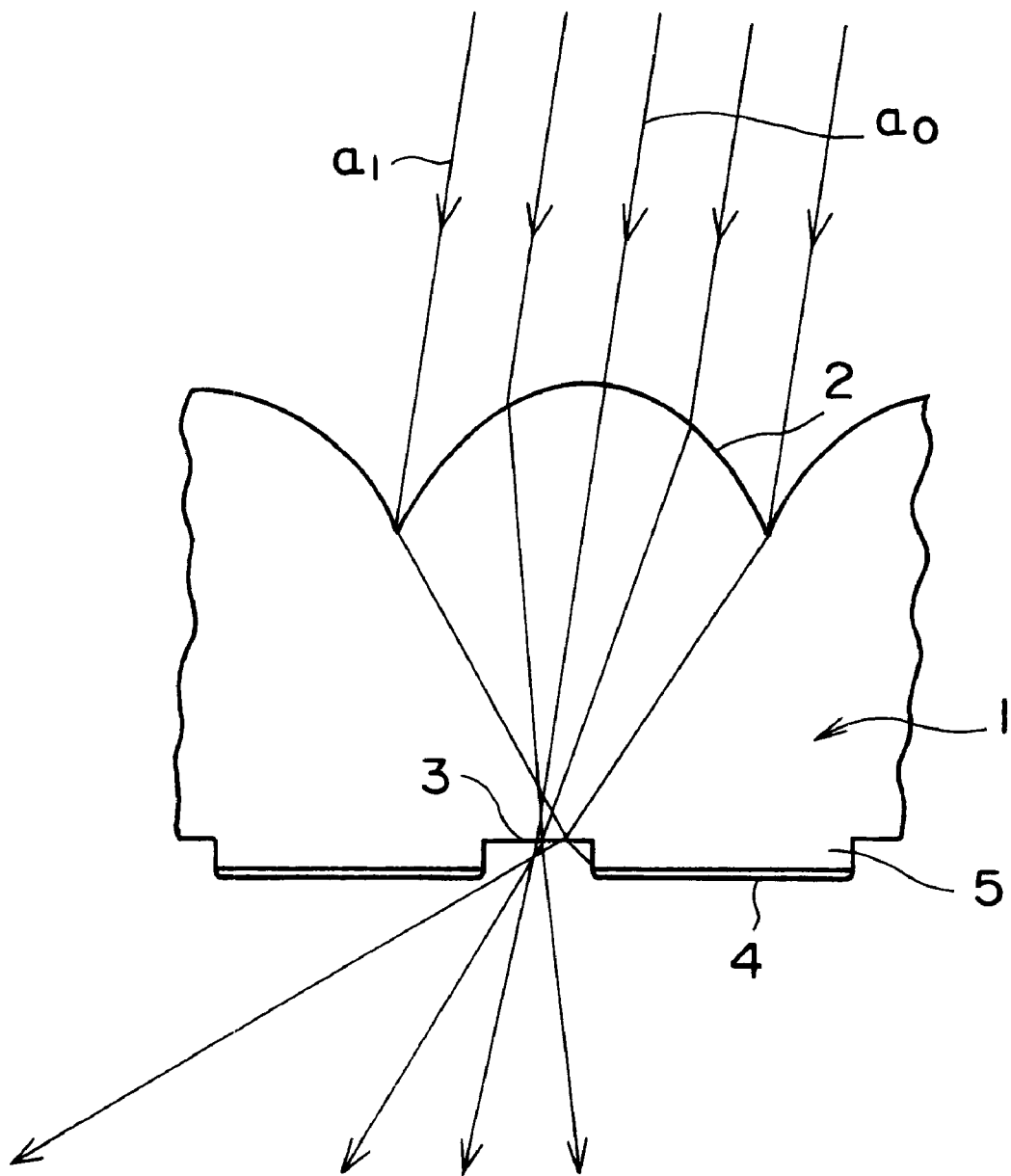
FIG. 9 is a fragmentary sectional view for assistance in explaining problems that arise in a conventional lenticular lens sheet when determining the positional difference for attaining optical registration.

A model of such a lenticular lens sheet is shown in FIG. 8, reference characters 1 to 5 designate parts like or corresponding to those designated by the same reference characters in FIG. 1, and a reference character 6 indicates the boundary between a nondiffusion layer on the back side and a diffusion layer containing a light diffusing material on the front side. Referring to FIG. 8, a light ray $a_2$ diffused by a Fresnel lens and falling on a lenticular lens sheet 1 at a ⅓-luminance angle ($\beta$ value) $\beta_F$ is refracted by a back lens 2 of the lenticular lens sheet 1 and travels through the lenticular lens sheet 1 along a path inclined at an angle $\beta'_F$ to a normal to an imaginary back surface of the lenticular lens sheet 1. The angles $\beta_F$ and $\beta'_F$ meet Snell's law. Incident light rays are further diffused by the light diffusing material contained in the diffusion layer of the lenticular lens sheet 1. Diffusion of light rays in the lenticular lens sheet 1 is represented by angle $\beta'_L$ of ⅓-luminance angle $\beta_L$ of diffusion by the lenticular lens sheet 1 proper in the lenticular lens sheet 1 at the middle point in the diffusion layer of the lenticular lens sheet 1. Then, the light ray $a_2$ leaves the lenticular lens sheet 1 at a point at a distance w from the center of the front lens 3. The distance w is calculated by using the following expression:

$w=(t-t_D/2)\tan\{\sin^{-1}(\sin\beta_F/n)\}+t_D/2\times\tan\{\sin^{-1}(\sin\beta_F/n)+\sin^{-1}(\sin\beta_L/n)\}$.

The width of the front lens 3 must not be smaller than 2w and hence each of the areas of the light absorbing layer 4 cannot be formed in a width greater than p-2w. Therefore, (BS ratio)≦(1-2w/p)×100 (%)

Generally, the light absorbing layer 4 is formed on the surfaces of elevated sections 5 formed by elevating non-lens sections of the front surface of the lenticular lens sheet 1 because the light absorbing layer 4 can be easily formed on the surfaces of the elevated sections 5, and because the reduction of the BS ratio is small when the lenticular lens sheet is viewed in an oblique direction. Although dependent on the fluidity of screening ink for forming the light absorbing layers 4, the height of the elevated sections 5 from the surfaces of the front lenses 3 must be in the range of 40 to 50 μm. Although any problem does not arise with the conventional lenticular lens sheet having a small BS ratio, light rays are trapped by the elevated sections 5 and thereby the viewing angle is reduced when the BS ratio is excessively large. The following inequality must be met:

$p(100-BS)/200H \geq \sqrt{3}$ where p is the pitch of the back lenses 2 of the lenticular lens sheet, BS is the BS ratio, and H is the height of the light absorbing layer 4 from the surface of the front lenses 3 (FIG. 1). If H=50 μm and the pitch p is in the range of 0.6 to 0.7 mm, the BS ratio is on the order of 70% at the greatest. If the edges 5' of the elevated sections 5 are rounded, the quantity of trapped light can be reduced without reducing the BS ratio and thereby the viewing angle can be increased.

As mentioned above, it is possible that some of the light rays leaving the front lenses 3 on the front side of the lenticular lens sheet 1 are trapped by the elevated sections 5 if the light absorbing layer 4 are formed on the surfaces of the elevated sections 5 having a substantially rectangular cross section by printing or the like. If optical registration is determined on the basis of an optical path along which a light ray fall on the top of each of the front lenses 3, which is a general method, part of the light rays leaving the lenticular lens sheet 1 is trapped by the elevated sections 5 if the BS ratio is increased. Positional difference d determined on the basis of the behavior of the light ray fallen on the root edge 2' of the back lens 2 can be calculated by using the following expression:

$$d = \frac{p}{2}\left(\tan\left[\phi - \sin^{-1}\left\{\frac{\sin(\phi-\theta)}{n}\right\}\right] - \tan\left[\phi - \sin^{-1}\left\{\frac{\sin(\phi+\theta)}{n}\right\}\right]\right) \div$$
$$\left(\tan\left[\phi - \sin^{-1}\left\{\frac{\sin(\phi-\theta)}{n}\right\}\right] + \tan\left[\phi - \sin^{-1}\left\{\frac{\sin(\phi+\theta)}{n}\right\}\right]\right).$$

Figure 4:
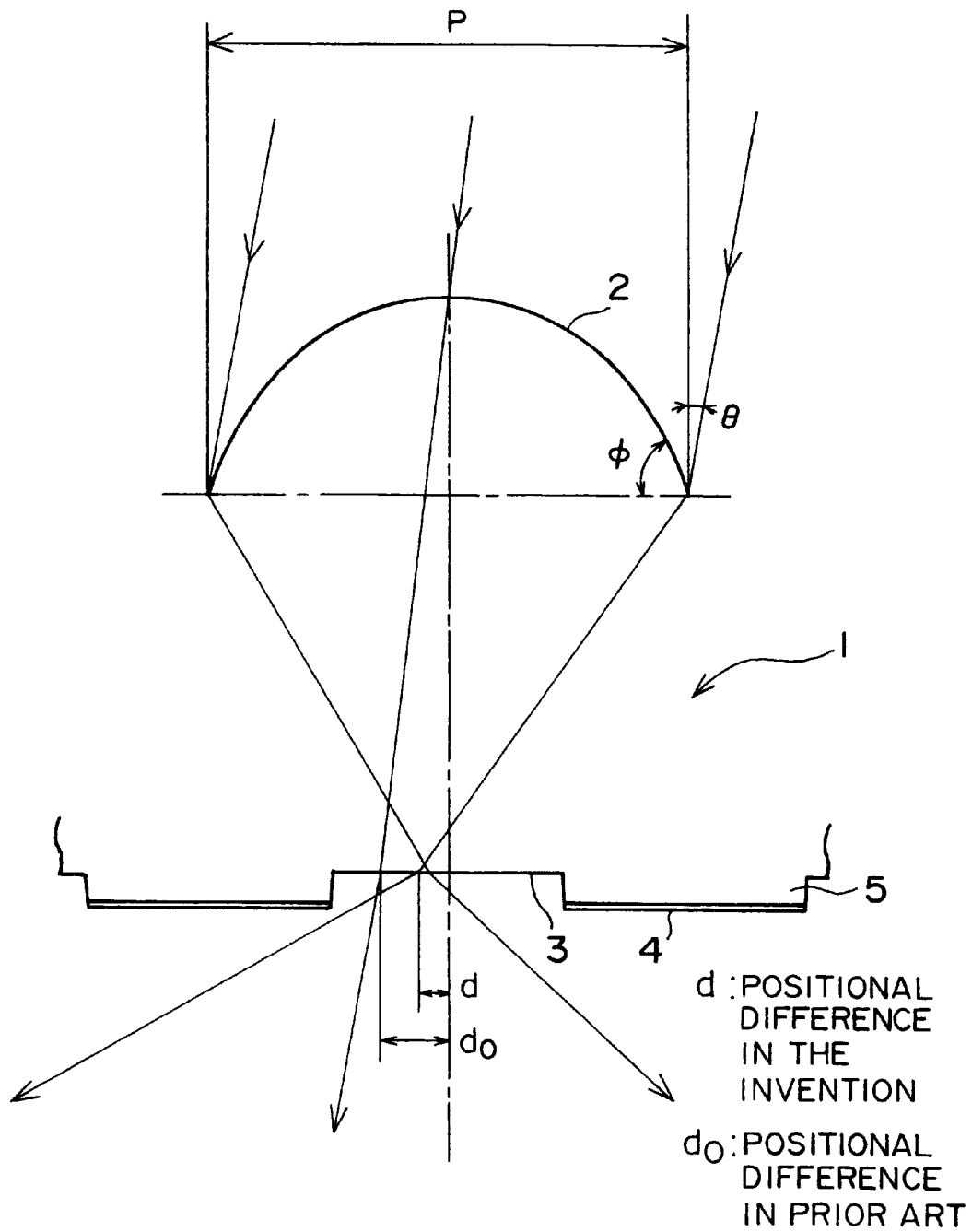
FIG. 4 is a diagrammatic view showing the positional difference for attaining optical registration between a lenticular lens sheet according to the present invention and a conventional lenticular lens sheet.

If the optical registration is thus determined on the basis of the behavior of the light rays fallen on the root edge 2' of the back lens 2, the quantity of light trapped by the elevated sections 5 can be limited to a minimum. FIG. 4 shows the relation between the positional difference d according to the present invention and the conventional positional difference $d_0$ (JP 59-69748A).

As is apparent from the foregoing description, a lenticular lens sheet according to the present invention for use as a rear-projection screen comprises a body sheet, back lenses having a substantially elliptical cross section and formed in the back surface of the body sheet, front lenses formed on a front surface of the body sheet at the focal points of the back lenses, or in the vicinity thereof, and a light absorbing layer formed on sections of the front surface at the non-focal points of the back lenses. In this lenticular lens sheet, the pitch p of the back and the front lenses, and the thickness t of the lenticular lens sheet, i.e., the distance between a plane in contact with the back lenses and a plane in contact with the front lenses, meet an inequality: $1.1 \leq t/p \leq 1.4$, and the conic coefficient k of a conic section defining the cross section of the back lenses is in the range of −0.5 to −0.4.

Another lenticular lens sheet according to the present invention for use as a rear-projection screen comprises a body sheet, back lenses having a substantially elliptical cross section and formed in a back surface of the body sheet, front lenses formed at the focal points of the back lenses, or in the vicinity thereof, and a light absorbing layer formed on sections of the front surface at the non-focal points of the back lenses. In this lenticular lens sheet, the pitch p of the back and the front lenses, and the paraxial radius of curvature c meet an inequality: $p/2c \geq 0.9$, and the conic coefficient k of a conic section defining the cross section of the back lenses is in the range of −0.5 to −0.4.

It is desirable that the BS ratio, i.e., the ratio of the area of the light absorbing layer formed on sections of the front surface at the non-focal points of the back lenses to that of the front surface of the lenticular lens sheet, be as high as possible, on the condition that the BS ratio meets an inequality:

$$BS \leq (1-2w/p) \times 100 \ (\%),$$

where:

$$w=(t-t_D/2) \tan\{\sin^{-1}(\sin \beta_F/n)\}+t_D/2 \times \tan\{\sin^{-1}(\sin \beta_F/n)+\sin^{-1}(\sin \beta_L/n)\}$$

t is the thickness of the lenticular lens sheet, $t_D$ is the thickness of the diffusing layer, n is the refractive index of the lenticular lens sheet, $\beta_F$ is the ⅓-luminance angle of diffusion of light rays before falling on the lenticular lens sheet, and $\beta_L$ is the ⅓-luminance angle of diffusion of light rays caused by the light diffusing material contained in the lenticular lens sheet.

Generally, the viewer can not recognize deterioration of the contrast when the BS ratio is reduced by 1%, but the viewer can recognize that when the BS ratio is reduced by 5%. Thus, it is also desirable that the BS ratio meet an inequality:

$$BS \ \text{ratio} \geq 0.95 \times (1-2w/p) \times 100 (\%).$$

Desirably, elevated sections of a substantially rectangular cross section are formed on the front surface at the non-focal points of the back lenses, the light absorbing layer is formed on the surfaces of the elevated sections, and the pitch p of the back and the front lenses, the BS ratio (%) and the height of the elevated sections from a plane including the tops of the front lenses meet:

$$p(100-BS)/200H \geq \sqrt{3}.$$

Desirably, the light absorbing layer is formed on the surfaces of the elevated sections, and the edges of the elevated sections are rounded.

Furthermore, it is desirable that the positional difference d of a point on the front lens from which light rays leaves the lenticular lens sheet from the optical axis of the corresponding front lens meet the condition expressed by:

$$d = \frac{p}{2}\left(\tan\left[\phi-\sin^{-1}\left\{\frac{\sin(\phi-\theta)}{n}\right\}\right]-\tan\left[\phi-\sin^{-1}\left\{\frac{\sin(\phi+\theta)}{n}\right\}\right]\right) \div \left(\tan\left[\phi-\sin^{-1}\left\{\frac{\sin(\phi-\theta)}{n}\right\}\right]+\tan\left[\phi-\sin^{-1}\left\{\frac{\sin(\phi+\theta)}{n}\right\}\right]\right)$$

where p is the pitch of the back lenses, n is the refractive index of the lenticular lens sheet, φ is the angle of a tangent to the back lens at the root edge of the same to a plane including the opposite roots of each back lens, and θ is the angle of the path of a light ray falling on the back lens to the optical axis of the same.

Examples of the lenticular lens sheet according to the present invention will be described in comparison with comparative examples.

EXAMPLE 1

A lenticular lens sheet of an impact-resistant acrylic resin (refractive index: 1.51) was molded by extrusion molding. The lenticular lens sheet was provided with back lenses on its back surface and front lenses on its front surface at a pitch of 0.72 mm, which is ¼.₅ of the pitch of a projection type LCD. The thickness of the lenticular lens sheet, i.e., the distance between imaginary planes in contact respectively with the tops of the back lenses and those of the front lenses, was 0.86 mm, the BS ratio was 70%, and the height of the surface of elevated sections of the front surface provided with a light absorbing layer was 50 μm. The lenticular lens sheet contained a light diffusing material prepared by mixing six parts acrylic resin beads (refractive index: 1.49) of 30 μm in mean diameter and one part glass beads (refractive index: 1.535) of 17 μm in mean diameter in a glass bead concentration of 2.1 parts by weight. The surfaces of the back lenses had a shape represented by k=−0.45 and c=0.33 mm. The front lenses were convex lenses of 0.254 mm in radius of curvature.

A Fresnel lens of 1.8 mm in thickness was formed by molding the same impact-resistant acrylic resin containing the foregoing glass beads by an UV molding process.

The lenticular lens sheet and the Fresnel lens were combined to construct a display screen, and the center gain (PG), the transmittance and the reflectivity of the front surface of the display screen were measured. Measured results are tabulated in Table 2. The lenticular lens sheet had $\beta_F$ of 7.5° and $\beta_L$ of 8°. In the lenticular lens sheet, 60% of the lenticular lens sheet was a light diffusing layer and hence $t_D$=0.516. The BS ratio of the lenticular lens sheet estimated by calculation using those values was 72% or below.

COMPARATIVE EXAMPLE 1

A lenticular lens sheet in Comparative Example 1 was molded by using a mold for molding a conventional three-CRT lenticular lens sheet of 45% in BS ratio. The lenticular lens sheet was provided with back lenses on its back surface and front lenses on its front surface at a pitch of 0.72. The thickness of the lenticular lens sheet, i.e., the distance between imaginary planes in contact respectively with the tops of the back lenses and those of the front lenses, was 0.88. The same acrylic resin and the same light diffusing material as those used for forming the lenticular lens sheet in Example 1 were used, and the light diffusing material concentration was adjusted so that the center gain of the lenticular lens sheet in Comparative Example 1 was equal to that of the lenticular lens sheet in Example 1. The surfaces of the back lenses had a shape represented by k=−0.75 and c=0.25 mm. The front lenses were convex lenses of 0.254 mm in radius of curvature.

The same Fresnel lens as that used in combination with the lenticular lens sheet in Example 1 was combined with the lenticular lens sheet in Comparative Example 1 to construct a display screen. The center gain (PG), the transmittance and the reflectivity of the front surface of the display screen were measured. Measured results are tabulated in Table 2.

TABLE 2

|  | PG | Transmittance T | Reflectivity R | Contrast T/R |
|---|---|---|---|---|
| Example 1 | 3.69 | 59.6% | 5.4 | 11.0 |
| Comp. Example 1 | 3.69 | 62.0% | 6.1 | 10.2 |

The lenticular lens sheet in Example 1 and the lenticular lens sheet in Comparative Example 1 were used in combination with a projection LCD television system for comparison. The contrast of pictures displayed on the lenticular lens sheet in Example 1 and viewed from directions at angles in the range of 45° to 60° to a normal to the lenticular lens sheet was far higher than that of pictures displayed on the lenticular lens sheet in Comparative Example 1 and viewed from the same directions.

Figure 5:
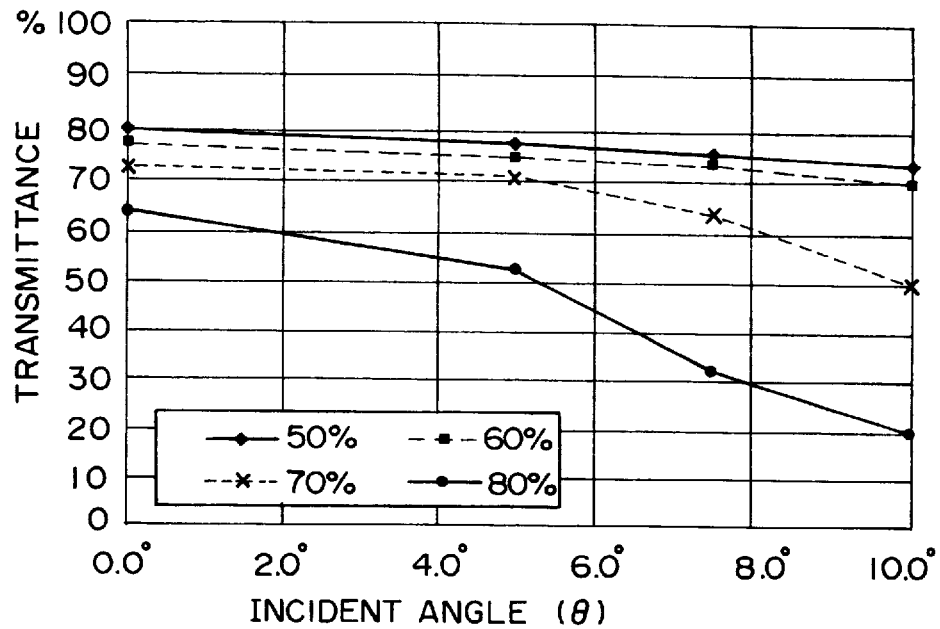
FIG. 5 is graph showing the variation of transmittance with incident angle for different light absorbing layers respectively having different BS ratios.

Lenticular lens sheets in Examples 2, 3 and 4 respectively having BS ratios of 50%, 60% and 80% were made. Light rays were projected on the lenticular lens sheets in Examples 1, 2, 3 and 4 at incident angles θ of 0°, 5°, 7.5° and 10°, and the transmittance of the lenticular lens sheets was measured. Measured results are shown in FIG. 5. Performance indices p(100−BS)/200H for the lenticular lens sheets in Examples 1, 2, 3 and 4 are tabulated in Table 3.

TABLE 3

| Examples | 1 | 2 | 3 | 4 |
|---|---|---|---|---|
| BS ratio (%) | 70 | 50 | 60 | 80 |
| p(100-BS)/200H | 2.16 | 3.60 | 2.88 | 1.44 |

When the incident angle θ was 5° or 7.5°, the a value (angle at which gain is equal to ½ of center gain PG) of light diffusion by the Fresnel lens used in combination with the lenticular lens sheets in Examples 1, 2, 3 and 4 is approximately equal to β value (angle at which gain is equal to ⅓ of center gain PG).

As is obvious from FIG. 5, the transmittance of the lenticular lens sheets provided with the lenses at a pitch of 0.72 mm remains on a relatively high level when the BS ratio is 70% or below, but the transmittance of the lenticular lens sheet provided with the lenses at a pitch of 0.72 mm and 80% in BS ratio is low.

Figure 6:
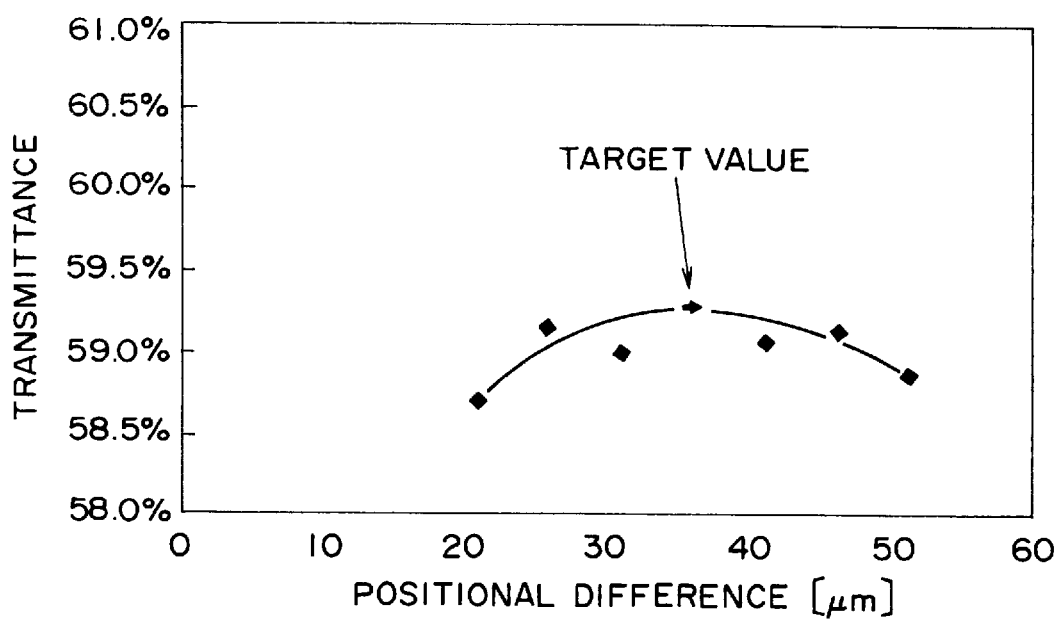
FIG. 6 is a graph showing the variation of transmittance with the positional difference in a lenticular lens sheet according to the present invention.
Figure 7A:
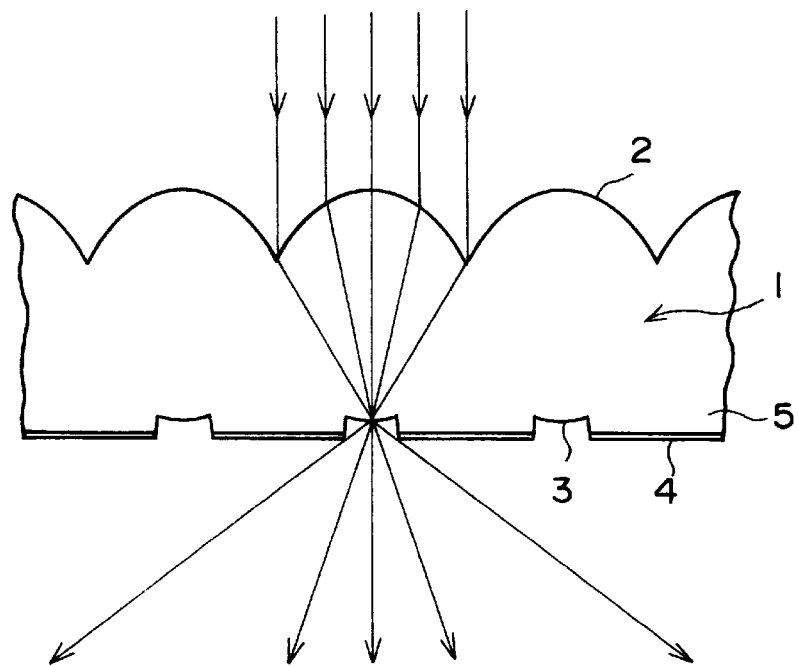
FIGS. 7A and 7B are enlarged fragmentary sectional views comparatively showing a single-tube lenticular lens sheet and a three-tube lenticular lens sheet.
Figure 7B:
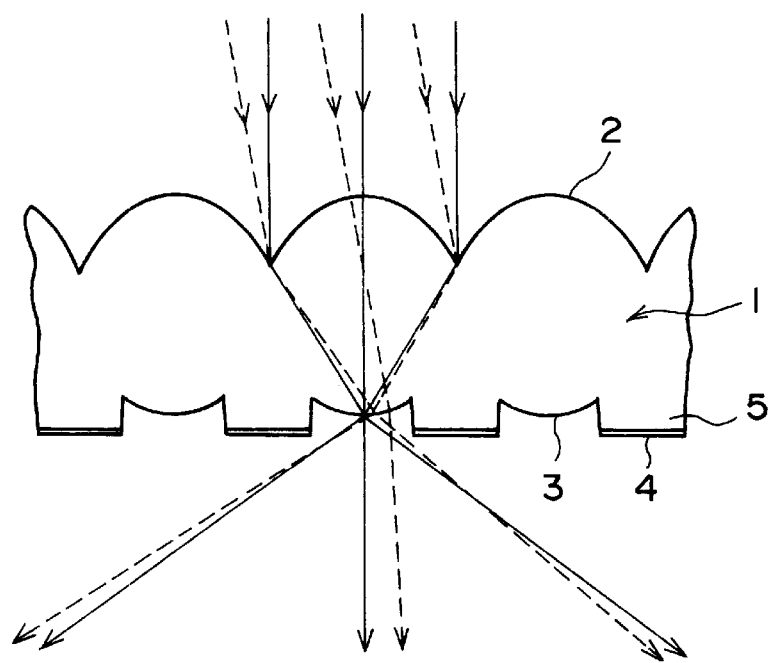

FIG. 6 is a graph showing the respective transmittances of display screens constructed by combining lenticular lens sheets in accordance with the present invention of 21 μm, 26 μm, 31 μm, 36 μm, 41 μm, 46 μm and 51 μm in positional difference, respectively, with a Fresnel lens of 1.55 in refractive index and 10.6° in lens angle (outgoing angle: 6°, desired registration determined on the basis of the present invention: 36 μm). The lenticular lens sheet having a registration calculated by using an expression proposed by the present invention had the highest transmittance.

As is apparent from the foregoing description, the lenticular lens sheet of the present invention for use as a rear-projection screen is provided with the light absorbing layer formed in a large BS ratio, is not susceptible to the influence of variation of the positional difference between the back and the front surface, is capable of displaying pictures projected by a single picture source in a high contrast and high brightness for satisfactory viewing in a wide angle of field.

Although the invention has been described in its preferred embodiments with a certain degree of particularity, obviously many changes and variations are possible therein. It is therefore to be understood that the present invention may be practiced otherwise than as specifically described herein without departing from the scope and spirit thereof.

What is claimed is:

1. A lenticular lens sheet for use as a rear projection screen, said lens sheet comprising:
   a body sheet having a front surface and a back surface, said body sheet containing a light diffusing material forming a diffusing layer at least on said front surface;
   back lenses having a substantially elliptical cross section and formed in the back surface of the body sheet, said back lenses having focal points, respectively;
   front lenses formed in the front surface of the body sheet at the focal points of the back lenses, or in the vicinity thereof; and
   a light absorbing layer formed on sections of the front surface at the non-focal points of the back lenses;
   wherein the light absorbing layer is formed in a BS (Black Stripe) ratio meeting an inequality:

$$BS \leq (1-2w/p) \times 100(\%)$$

where:
   p presents pitches of the back and front lenses and $$w=(t-t_D/2)\tan\{\sin^{-1}(\sin\beta_F/n)\}+t_D/2\times\tan\{\sin^{-1}(\sin\beta_F/n)+\sin^{-1}(\sin\beta_L/n)\}.$$

and t is a thickness of the lenticular lens sheet, $t_D$ is a thickness of the diffusing layer, n is a refractive index of the lenticular lens sheet, $\beta_F$ is a ⅓-luminance angle of diffusion of light rays before falling on the lenticular lens sheet (1), and $\beta_L$ is a ⅓-luminance angle of diffusion of light rays caused by the light diffusing material contained in the lenticular lens sheet.

2. The lenticular lens sheet according to claim 1 wherein the pitches p of the back and front lenses, and the thickness t of the lenticular lens sheet equal to a distance between a plane in contact with the back lenses and a plane in contact with the front lenses, meet an inequality: $1.1 \leq t/p \leq 1.4$, and conic coefficient k of a conic section defining the cross section of the back lenses is in a range of −0.5 to −0.4.

3. The lenticular lens sheet according to claim 1, wherein elevated sections of a substantially rectangular cross section are formed on the front surface at the non-focal points of the back lenses, the light absorbing layer is formed on the surfaces of the elevated sections, and the pitch p of the back and the front lenses, the BS ratio (%) and height of the elevated sections from a plane including the tops of the front lenses meet:

$$p(100-BS)/200H \geq \sqrt{3}$$

where: H is a height of the light absorbing layer from the tops of the front lenses.

4. The lenticular lens sheet according to claim 1, wherein the light absorbing layer is formed on the surfaces of the elevated sections, and the ridges of the elevated sections are rounded.

5. The lenticular lens sheet according to claim 1, wherein a positional difference d of a point on the front lens from which light rays leave the lenticular lens sheet from the optical axis of the corresponding front lens meet a condition expressed by:

$$d = \frac{p}{2}\left(\tan\left[\phi - \sin^{-1}\left\{\frac{\sin(\phi-\theta)}{n}\right\}\right] - \tan\left[\phi - \sin^{-1}\left\{\frac{\sin(\phi+\theta)}{n}\right\}\right]\right) \div \left(\tan\left[\phi - \sin^{-1}\left\{\frac{\sin(\phi-\theta)}{n}\right\}\right] + \tan\left[\phi - \sin^{-1}\left\{\frac{\sin(\phi+\theta)}{n}\right\}\right]\right)$$

where p is the pitch of the back lenses, n is the refractive index of the lenticular lens sheet, $\phi$ is the angle of a tangent to the back lens at the root edges of the same to a plane including the opposite root edges of each back lens, and $\theta$ is the angle of the path of a light ray falling on the back lenses to the optical axis of the same.

6. A lenticular lens sheet for use as a rear projection screen, said lens sheet comprising:
   a body sheet having a front surface and a back surface;
   back lenses having a substantially elliptical cross section and formed in the back surface of the body sheet, said back lenses having focal points, respectively;
   front lenses formed in the front surface of the body sheet at the focal points of the back lenses, or in the vicinity thereof; and
   a light absorbing layer formed on sections of the front surface at the non-focal points of the back lenses;
   wherein pitches p of the back and the front lenses, and paraxial radius of curvature c of the back lenses meet an inequality: p/2c≧0.9, and the conic coefficient k of a conic section defining the cross section of the back lenses is in a range of −0.5 to −0.4.

7. The lenticular lens sheet according to claim 6, wherein the pitches p of the back and front lenses, and a thickness t of the lenticular lens sheet equal to a distance between a plane in contact with the back lenses and a plane in contact with the front lenses, meet an inequality: 1.1≦t/p≦1.4.

8. The lenticular lens sheet according to claim 6, wherein elevated sections of a substantially rectangular cross section are formed on the front surface at the non-focal points of the back lenses, the light absorbing layer is formed on the surfaces of the elevated sections, and the pitch p of the back and the front lenses, the BS (Black Stripe) ratio (%) and height of the elevated sections (5) from a plane including the tops of the front lenses meet:

$$p(100-BS)/200H \geq \sqrt{3}$$

where: H is a height of the light absorbing layer from the tops of the front lenses.

9. The lenticular lens sheet according to claim 6, wherein the light absorbing layer is formed on the surfaces of the elevated sections, and the ridges of the elevated sections are rounded.

10. The lenticular lens sheet according to claim 6, wherein a positional difference d of a point on the front lens from which light rays leave the lenticular lens sheet from the optical axis of the corresponding front lens meet a condition expressed by:

$$d = \frac{p}{2}\left(\tan\left[\phi - \sin^{-1}\left\{\frac{\sin(\phi-\theta)}{n}\right\}\right] - \tan\left[\phi - \sin^{-1}\left\{\frac{\sin(\phi+\theta)}{n}\right\}\right]\right) \div \left(\tan\left[\phi - \sin^{-1}\left\{\frac{\sin(\phi-\theta)}{n}\right\}\right] + \tan\left[\phi - \sin^{-1}\left\{\frac{\sin(\phi+\theta)}{n}\right\}\right]\right)$$

where p is the pitch of the back lenses, n is the refractive index of the lenticular lens sheet, $\phi$ is the angle of a tangent to the back lens at the root edges of the same to a plane including the opposite root edges of each back lens, and $\theta$ is the angle of the path of a light ray falling on the back lenses to the optical axis of the same.

\* \* \* \* \*